US008588178B2

(12) United States Patent
Borran et al.

(10) Patent No.: US 8,588,178 B2
(45) Date of Patent: Nov. 19, 2013

(54) ADAPTIVE ASSOCIATION AND JOINT ASSOCIATION AND RESOURCE PARTITIONING IN A WIRELESS COMMUNICATION NETWORK

(75) Inventors: Jaber Mohammad Borran, San Diego, CA (US); Aamod Dinkar Khandekar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 505 days.

(21) Appl. No.: 12/725,128

(22) Filed: Mar. 16, 2010

(65) Prior Publication Data

US 2010/0238884 A1 Sep. 23, 2010

Related U.S. Application Data

(60) Provisional application No. 61/161,648, filed on Mar. 19, 2009.

(51) Int. Cl.
*H04W 4/00* (2009.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| 5,455,821 | A | 10/1995 | Schaeffer et al. | |
|---|---|---|---|---|
| 2008/0166976 | A1* | 7/2008 | Rao | 455/69 |
| 2008/0233967 | A1* | 9/2008 | Montojo et al. | 455/452.2 |
| 2009/0197603 | A1* | 8/2009 | Ji et al. | 455/436 |
| 2009/0264123 | A1* | 10/2009 | Agashe et al. | 455/434 |
| 2011/0039589 | A1* | 2/2011 | Skov | 455/501 |
| 2011/0134759 | A1* | 6/2011 | Kim et al. | 370/242 |
| 2011/0194423 | A1* | 8/2011 | Cho et al. | 370/252 |
| 2012/0287859 | A1* | 11/2012 | Ji et al. | 370/328 |
| 2013/0028230 | A1 | 1/2013 | Borran et al. | |

FOREIGN PATENT DOCUMENTS

| EP | 1532831 | 5/2005 |
|---|---|---|
| WO | WO2007149616 | 12/2007 |
| WO | WO2008067471 | 6/2008 |
| WO | 2008135101 A1 | 11/2008 |
| WO | WO2008157799 | 12/2008 |
| WO | WO2009009401 | 1/2009 |

OTHER PUBLICATIONS

International Search Report and Written Opinion—PCT/US2010/028043, International Search Authority—European Patent Office—Oct. 5, 2010.
Taiwan Search Report—TW099108250—TIPO—Jan. 17, 2013.

\* cited by examiner

*Primary Examiner* — Clemence Han
(74) *Attorney, Agent, or Firm* — Nerrie M. Zohn

(57) ABSTRACT

Techniques for supporting communication in a wireless network are described. In an aspect, association and resource partitioning may be performed jointly to select serving base stations for user equipments (UEs) and to allocate available resources to base stations. In another aspect, adaptive association may be performed to select serving base stations for UEs. In one design, a base station computes local metrics for different possible actions related to association and resource partitioning (or only association). The base station receives local metrics for the possible actions from at least one neighbor base station and determines overall metrics for the possible actions based on the computed and received local metrics. The base station determines serving base stations for a set of UEs and resources allocated to the set of base stations (or just serving base stations for the set of UEs) based on the overall metrics for the possible actions.

33 Claims, 6 Drawing Sheets

ADAPTIVE ASSOCIATION AND JOINT ASSOCIATION AND RESOURCE PARTITIONING IN A WIRELESS COMMUNICATION NETWORK

The present application claims priority to provisional U.S. Application Ser. No. 61/161,648, entitled "JOINT ASSOCIATION AND RESOURCE PARTITIONING FOR HETEROGENEOUS NETWORKS," filed Mar. 19, 2009, assigned to the assignee hereof and incorporated herein by reference.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data on the downlink to a UE and/or may receive data on the uplink from the UE. On the downlink, a transmission from the base station may observe interference due to transmissions from neighbor base stations. On the uplink, a transmission from the UE may observe interference due to transmissions from other UEs communicating with the neighbor base stations. For both the downlink and uplink, the interference due to interfering base stations and interfering UEs may degrade performance. It may be desirable to mitigate interference in order to improve performance.

SUMMARY

Techniques for performing adaptive association and joint association and resource partitioning in a wireless network are described herein. Association refers to a process to determine a serving base station for a UE. Resource partitioning refers to a process to allocate available resources to base stations. Association may also be referred to as server selection. Resource partitioning may also be referred to as resource allocation, resource coordination, etc.

In an aspect, association and resource partitioning may be performed jointly. For joint association and resource partitioning, serving base stations may be selected for UEs and available resources may be allocated to base stations by considering different possible associations between UEs and base stations and different possible allocations of resources to base stations. In one design, joint association and resource partitioning may be performed in a distributed manner by each base station in a set of base stations. In one design, a given base station in the set of base stations may compute local metrics for a plurality of possible actions related to association and resource partitioning. The base station may receive local metrics for the plurality of possible actions from at least one neighbor base station and may determine overall metrics for these possible actions based on the computed local metrics and the received local metrics. The base station may then determine serving base stations for a set of UEs and resources allocated to the set of base stations based on the overall metrics for the plurality of possible actions.

In another aspect, adaptive association may be performed to select serving base stations for UEs by considering different possible associations between UEs and base stations, e.g., based on the current allocation of resources to the base stations. In one design, adaptive association may be performed in a distributed manner by each base station in a set of base stations. In one design, a given base station in the set of base stations may compute local metrics for a plurality of possible actions related to association. The base station may receive local metrics for the plurality of possible actions from at least one neighbor base station and may determine overall metrics for these possible actions based on the computed local metrics and the received local metrics. The base station may then determine serving base stations for a set of UEs based on the overall metrics for the plurality of possible actions.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
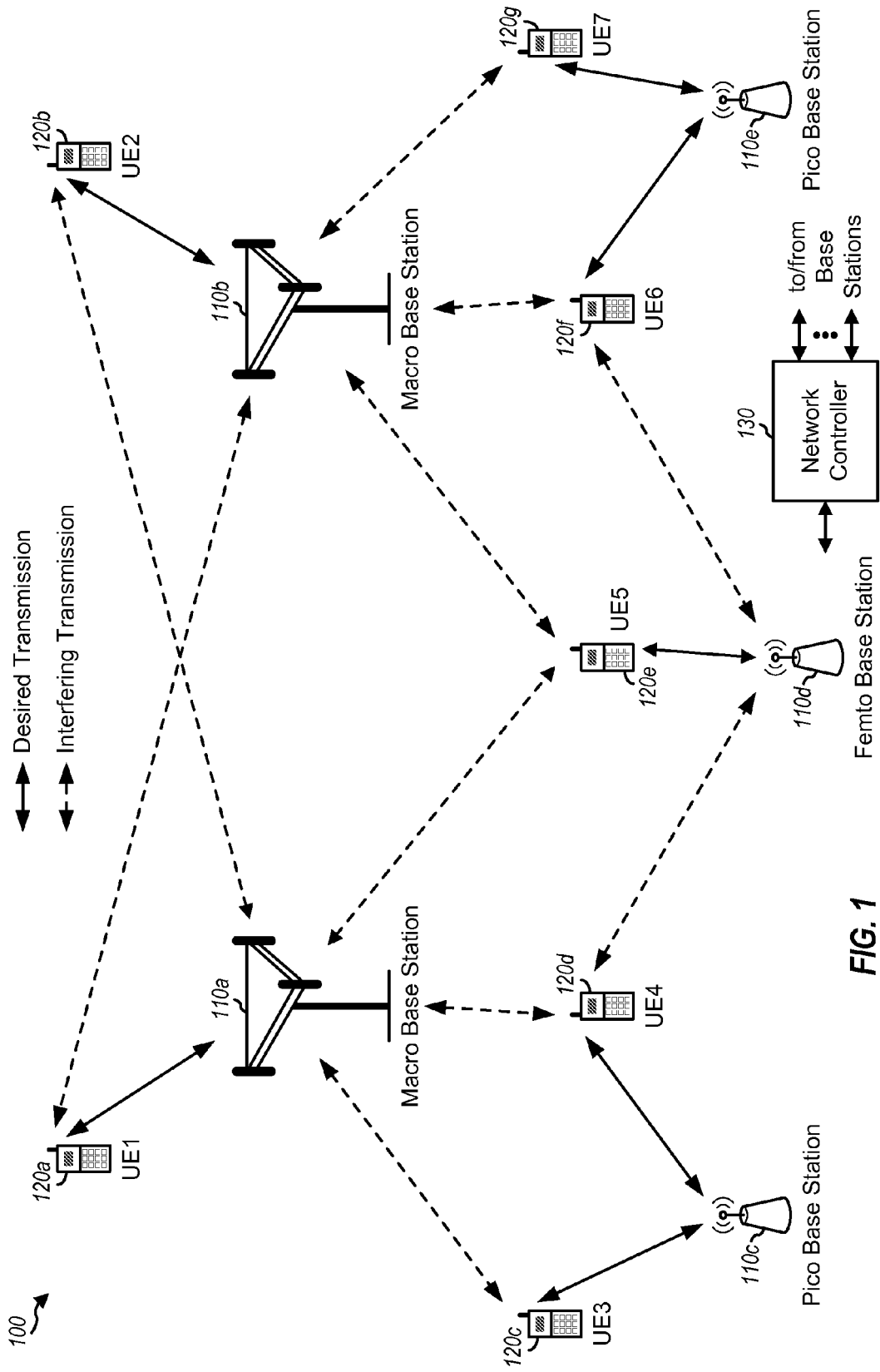
FIG. 1 shows a wireless communication network.

FIG. 1 shows a wireless communication network 100, which may include a number of base stations 110 and other network entities. A base station may be an entity that communicates with UEs and may also be referred to as a node, a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110a and 110b for macro cells, pico base stations 110c and 110e for pico cells, and a femto/home base station 110d for a femto cell.

Wireless network 100 may also include relay stations. A relay station is an entity that receives a transmission of data from an upstream entity (e.g., a base station or a UE) and sends a transmission of the data to a downstream entity (e.g., a UE or a base station). A relay station may communicate with a UE via the access link and with a base station via a backhaul link. A relay station may also be a UE that relays transmissions for other UEs. A relay station may also be referred to as a node, a station, a relay, a relay base station, etc.

Wireless network 100 may be a heterogeneous network that includes base stations of different types, e.g., macro base stations, pico base stations, femto base stations, relay stations, etc. These different types of base stations may have different transmit power levels, different coverage areas, and different impact on interference in wireless network 100. For example, macro base stations may have a high transmit power level (e.g., 20 Watts or 43 dBm), pico base stations and relay stations may have a lower transmit power level (e.g., 2 Watts or 33 dBm), and femto base stations may have a low transmit power level (e.g., 0.2 Watts or 23 dBm). Different types of base stations may belong in different power classes having different maximum transmit power levels.

A network controller 130 may couple to a set of base stations and may provide coordination and control for these base stations. Network controller 130 may communicate with base stations 110 via a backhaul. Base stations 110 may also communicate with one another via the backhaul.

UEs 120 may be dispersed throughout wireless network 100, and each UE may be stationary or mobile. A UE may also be referred to as a station, a terminal, a mobile station, a subscriber unit, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with base stations, relay stations, other UEs, etc.

A UE may be located within the coverage of one or more base stations. In one design, a single base station may be selected to serve the UE on both the downlink and uplink. In another design, one base station may be selected to serve the UE on each of the downlink and uplink. For both designs, a serving base station may be selected based on one or more metrics such as maximum geometry/signal strength, minimum pathloss, maximum energy/interference efficiency, maximum user throughput, etc. Geometry relates to received signal quality, which may be quantified by a carrier-over-thermal (CoT), a signal-to-noise ratio (SNR), a signal-to-noise-and-interference ratio (SINR), a carrier-to-interference ratio (C/I), etc. Maximizing energy/interference efficiency may entail (i) minimizing a required transmit energy per bit or (ii) minimizing a received interference energy per unit of received useful signal energy. Part (ii) may correspond to maximizing the ratio of channel gain for an intended station to a sum of channel gains for all interfered stations. Maximizing user throughput may take into account various factors such as the loading of a base station (e.g., the number of UEs currently served by the base station), the amount of resources allocated to the base station, the available backhaul capacity of the base station, etc.

Different metrics for server selection described above may provide better performance in different scenarios. For example, maximizing geometry may provide good performance on the downlink in many cases, assuming no limitations due to loading or resource partitioning. Minimizing pathloss may provide good performance in a heterogeneous network due to cell splitting gains. Maximizing energy/interference efficiency may often coincide with minimizing pathloss and may provide better performance in some cases. Maximizing user throughput may be better than maximizing energy/interference efficiency in many cases and may be based on current cell loading and resource partitioning.

Association may be performed for the UE when the UE is first powered on and may be referred to as initial association. Association may also be performed to select a new serving base station for handover of the UE.

Association may be challenging in a heterogeneous network for several reason. First, base stations with different transmit power levels (e.g., macro, pico, and femto base stations) may create link imbalance scenarios in the heterogeneous network. In such a scenario, connecting to the strongest base station on one link may result in a dominant interference scenario on the other link. Second, femto base stations with restricted association may impact association and may result in dominant interference scenarios. Third, different base stations in the heterogeneous network may have different backhaul capacities, which may impact association. There may be other potential issues with association in the heterogeneous network. These various potential issues with association may be addressed as described below.

The wireless network may support a set of resources for each of the downlink and uplink. The available resources may be defined based on time, or frequency, or both time and frequency, or some other criteria. For example, the available resources may correspond to different frequency subbands, or different time interlaces, or different time-frequency blocks, etc. A time interlace may include evenly spaced time slots, e.g., every S-th time slot, where S may be any integer value. The available resources may be defined for the entire wireless network.

The available resources may be used by base stations in the wireless network in various manners. In one scheme, each base station may use all of the available resources for transmission. This scheme may result in some base stations achieving poor performance. For example, femto base station 110d in FIG. 1 may be located within the vicinity of macro base stations 110a and 110b, and transmissions from femto base station 110d may observe high interference from macro base stations 110a and 110b. In another scheme, the available resources may be allocated to base stations based on a fixed resource partitioning. Each base station may then use its allocated resources for transmission. This scheme may enable each base station to achieve good performance on its allocated resources. However, some base stations may be allocated more resources than required whereas some other base stations may require more resources than allocated, which may lead to suboptimal performance for the wireless network.

Resource partitioning and association may be related, and one may affect the other. For example, a new association between a UE and a base station may shift loading from one base station to another base station and may trigger/require resource partitioning, e.g., to address high interference due to link imbalance or restricted association. Conversely, resource partitioning may affect signal and interference conditions on different resources, which may affect metrics used for determining association. For example, metrics such as downlink geometry may no longer be indicative of signal quality on all resources due to changes in signal and interference conditions resulting from resource partitioning. Furthermore, resource partitioning may affect the amount of available resources for base stations and may be affected by cell loading.

In an aspect, association and resource partitioning may be performed jointly. For joint association and resource partitioning, serving base stations may be selected for UEs and the available resources may be allocated to base stations by considering different possible associations between UEs and base stations and also different possible allocations of resources to base stations. This may allow association to take into account current resource partitioning and cell loading, allow resource partitioning to be updated based on association updates, and allow association to be updated based on changes in resource partitioning and/or other association updates.

In one design, joint association and resource partitioning may be performed in a centralized manner. In this design, a designated entity may receive pertinent information for UEs and base stations, compute metrics for association and resource partitioning, and select the best association and resource partitioning based on the computed metrics. In another design, joint association and resource partitioning may be performed in a distributed manner by a set of base stations. In this design, each base station may compute certain metrics and may exchange metrics with neighbor base stations. The metric computation and exchange may be performed for one or more rounds. Each base station may then determine and select the association and resource partitioning that can provide the best performance.

Joint association and resource partitioning may be performed for only the downlink, or only the uplink, or both the downlink and uplink. Resource partitioning may be performed in different manners for the downlink and uplink. For clarity, joint association and resource partitioning for the downlink is described in detail below.

Table 1 lists a set of components that may be used for joint association and resource partitioning for the downlink.

TABLE 1

Components for Joint Association and Resource Partitioning

| Component | Description |
|---|---|
| Active Set | A set of base stations maintained for a given UE t and denoted as AS(t). |
| Neighbor Set | A set of base stations maintained for a given base station p and denoted as NS(p). |
| Resources | Time and/or frequency resources that may be allocated to base stations. |
| Transmit PSD Levels | A set of transmit power spectral density (PSD) levels that may be used for any given resource by a base station. |
| Utility Function | A function used to quantify the performance of different possible association and resource partitioning. |

In one design, an active set may be maintained for each UE and may be determined based on pilot measurements made by the UE and/or pilot measurements made by base stations. An active set for a given UE t may include base stations that (i) have non-negligible contribution to signal or interference observed by UE t on the downlink and/or (ii) receive non-negligible signal or interference from UE t on the uplink. An active set may also be referred to as an interference management set, a candidate set, etc. In one design, a base station may be included in the active set of UE t if the CoT of this base station is greater than a threshold of $CoT_{min}$. A base station may also be included in the active set based on received signal strength and/or other criteria. The active set may be limited in order to reduce computation complexity for joint association and resource partitioning. In one design, the active set may be limited to N base stations and may include up to N strongest base stations with CoT exceeding $CoT_{min}$, where N may be any suitable value.

In one design, a neighbor set may be maintained for each base station and may include base stations that participate in joint association and resource partitioning. The neighbor set for each base station may be determined based on active sets of UEs. In one design, a neighbor set for a given base station p may include (i) base stations that are in the active sets of UEs served by base station p and (ii) base stations serving UEs that have base station p in their active sets. The neighbor set may thus include base station p and its neighbor base stations. The neighbor set may be limited in order to reduce computation complexity for joint association and resource partitioning.

Figure 2:
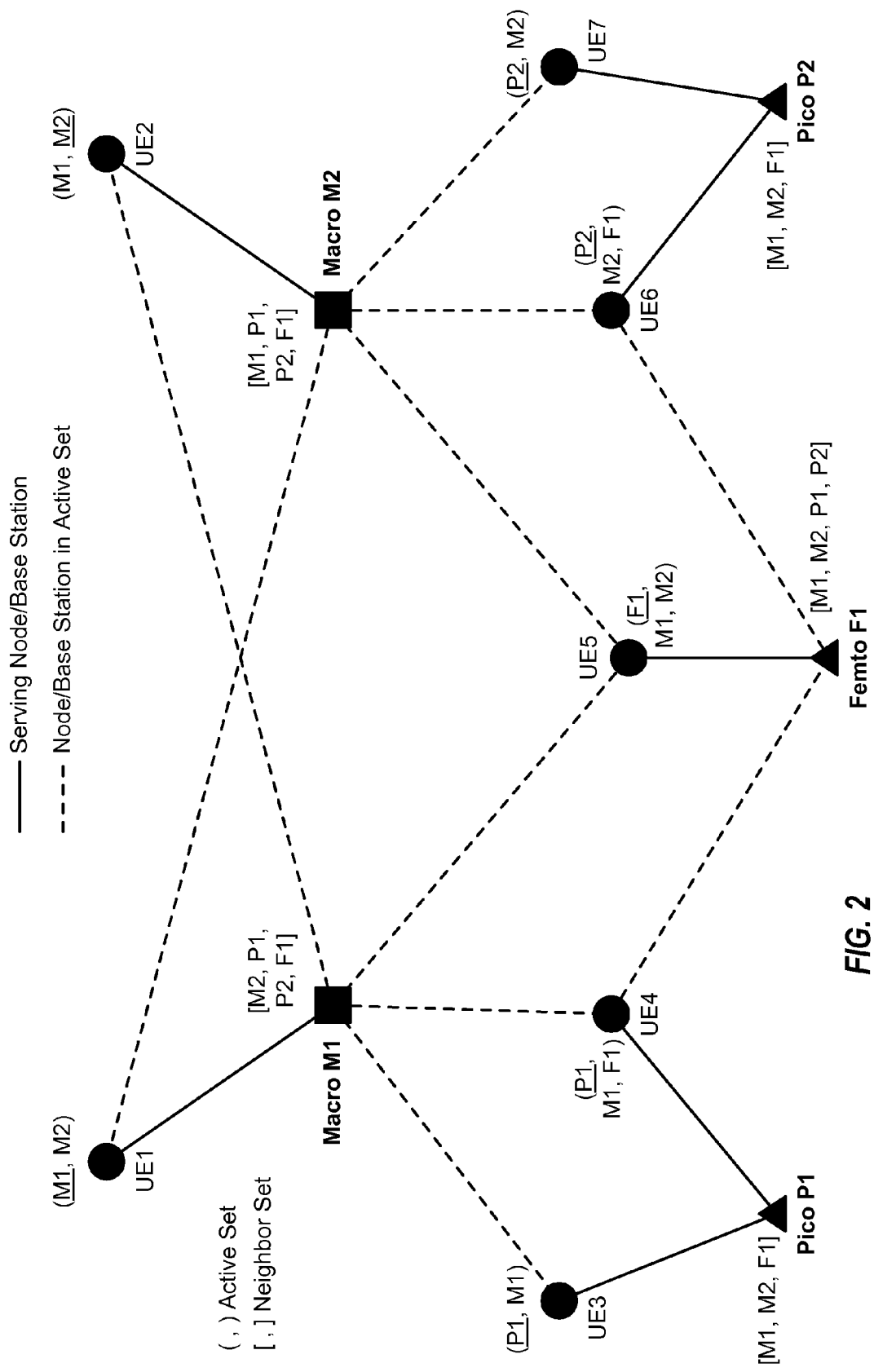
FIG. 2 shows exemplary active sets for UEs and neighbor sets for base stations.

FIG. 2 shows exemplary active sets for UEs and exemplary neighbor sets for base stations in FIG. 1. The active set for each UE is shown within parenthesis next to the UE in FIG. 2, with the serving base station being underlined. For example, the active set for UE1 is {M1, M2}, which means that the active set includes serving base station M1 and neighbor base station M2. The neighbor set for each base station is shown within brackets next to the base station in FIG. 2. For example, the neighbor set for base station M1 is [M2, P1, P2, F1] and includes macro base station M2, pico base stations P1 and P2, and femto base station F1.

In one design, a set of transmit PSD levels may be defined for each base station and may include all transmit PSD levels that can be used by the base station for each resource. A base station may use one of the transmit PSD levels for each resource on the downlink. Usage of a given resource may be defined by the transmit PSD level selected/allowed for that resource. In one design, the set of transmit PSD levels may include a nominal PSD level, a low PSD level, a zero PSD level, etc. The nominal PSD level on all available resources may correspond to the maximum transmit power of the base station. The set of transmit PSD levels for the base station may be dependent on the power class of the base station. In one design, the set of transmit PSD levels for a given power class may be the union of the nominal PSD levels of all power classes lower than or equal to this power class, plus zero PSD level. For example, a macro base station may include a nominal PSD level of 43 dBm (for the macro power class), a low PSD level of 33 dBm (corresponding to the nominal PSD level for the pico power class), and a zero PSD level. The set of transmit PSD levels for each power class may also be defined in other manners.

A utility function may be used to compute local metrics and overall metrics for joint association and resource partitioning. A local metric for a given base station p may be denoted as U(p) and may be indicative of the performance of the base station for a given association and resource partitioning. An overall metric for a set of base stations, NS, may be denoted as V(NS) and may be indicative of the overall performance of the set of base stations for a given association and resource partitioning. A local metric may also be referred to as a base station metric, local utility, base station utility, etc. An overall metric may also be referred to as overall utility, neighborhood utility, etc.

In one design, the utility function may be defined based on a sum of user rates, as follows:

$$U(p) = \sum_{S(t)=p} R(t) \text{ and } V(NS) = \sum_{p \in NS} U(p), \quad \text{Eq (1)}$$

where S(t) is a serving base station for UE t, and
R(t) is a rate achieved by UE t for base station p.

In another design, the utility function may be defined based on a minimum of user rates, as follows:

$$U(p) = \min_{S(t)=p} R(t) \text{ and } V(NS) = \min_{p \in NS} U(p). \quad \text{Eq (2)}$$

The utility function in equation (2) may ensure equal grade of service (GoS) for all UEs and may be less sensitive to outliers. In another design, an X % rate utility function may be defined in which local metric U(p) for base station p may be set equal to the highest rate of the lowest X % of all UEs served by base station p, where X may be any suitable value.

In yet another design, the utility function may be defined based on a sum of log of user rates, as follows:

$$U(p) = \sum_{S(t)=p} \log R(t) \text{ and } V(NS) = \sum_{p \in NS} U(p). \quad \text{Eq (3)}$$

The utility function in equation (3) may provide proportional fair scheduling.

In yet another design, the utility function may be defined based on a sum of log of log of user rates, as follows:

$$U(p) = \sum_{S(t)=p} \log\{\log R(t)\} \text{ and } V(NS) = \sum_{p \in NS} U(p). \quad \text{Eq (4)}$$

The utility function in equation (4) may account for contributions from each UE and may have more emphasis on tail distribution.

In yet another design, the utility function may be defined based on a sum of $-1/(\text{user rate})^3$, as follows:

$$U(p) = \sum_{S(t)=p} \frac{-1}{R(t)^3} \text{ and } V(NS) = \sum_{p \in NS} U(p). \quad \text{Eq (5)}$$

The utility function in equation (5) may be more fair than proportional fair metric.

Equation sets (1) through (5) show some exemplary designs of the utility function that may be used for joint association and resource partitioning. The utility function may also be defined in other manners. The utility function may also be defined based on other parameters instead of rate or in addition to rate. For example, the utility function may be defined based on a function of rate, latency, queue size, etc.

For the designs shown in equation sets (1) through (5), local metrics for each base station may be computed based on the rates of UEs served by that base station. In one design, the rate of each UE may be estimated by assuming that the UE is assigned a fraction of each available resource. This fraction may be denoted as α(t, r) and may be viewed as the fraction of time during which resource r is assigned to UE t. The rate for UE t may then be computed as follows:

$$R(t) = \sum_r \alpha(t, r) \cdot SE(t, r) \cdot W(r), \quad \text{Eq (6)}$$

where SE(t,r) is the spectral efficiency of UE t on resource r, and
W(r) is the bandwidth of resource r.

The spectral efficiency of UE t on resource r may be determined as follows:

$$SE(t, r) = C\left(\frac{PSD(p, r) \cdot G(p, t)}{N_0 + \sum_{q \neq p} PSD(q, r) \cdot G(q, t)}\right), \quad \text{Eq (7)}$$

where PSD(p,r) is the transmit PSD of serving base station p on resource r,
PSD(q,r) is the transmit PSD of neighbor base station q on resource r,
G(p,t) is the channel gain between serving base station p and UE t, G(q,t) is the channel gain between neighbor base station q and UE t, $N_0$ is ambient interference and thermal noise observed by UE t, and C( ) denotes a capacity function.

In equation (7), the numerator within the parenthesis denotes the desired received power from serving base station p at UE t. The denominator denotes the total interference from all neighbor base stations as well as $N_0$ at UE t. The transmit PSD used by serving base station p on resource r and the transmit PSD used by each neighbor base station on resource r may be known. The channel gains for serving base station p and the neighbor base stations may be obtained based on pilot measurements from UE t. $N_0$ may be measured/estimated by UE t and included in the computation, or may be reported by UE t to the wireless network (e.g., to base station p), or may be ignored (e.g., when the computation is done by base station p). The capacity function may be a constrained capacity function, an unconstrained capacity function, or some other function.

A pre-scheduler may perform scheduling forecast and may maximize the utility function over the space of the $\alpha(t,r)$ parameter, as follows:

$$\text{maximize } U(p), \text{ for } 0 \leq \alpha(t, r) \leq 1 \text{ and } \sum_{S(t)=p} \alpha(t, r) \leq 1. \quad \text{Eq (8)}$$

Equation (8) shows a convex optimization on the $\alpha(t,r)$ parameter and may be solved numerically.

The rate for UE t may be constrained as follows:

$$R(t) \leq R_{max}(t), \quad \text{Eq (9)}$$

where $R_{max}(t)$ is the maximum rate supported by UE t.

The overall rate R(p) for base station p may also be constrained as follows:

$$R(p) = \sum_{S(t)=p} R(t) \leq R_{BH}(p), \quad \text{Eq (10)}$$

where $R_{BH}(p)$ is the backhaul rate for base station p. The backhaul rate may be sent to neighbor base stations via the backhaul and/or over the air for association decisions.

The computation described above assumes that UE t is served by base station p. For association, UE t may be handed over from base station p to another base station in the neighbor set. In one design, a spectral efficiency SE(t,q,r) may be estimated for UE t on each resource r for each candidate base station q to which UE t might be handed over. This spectral efficiency may be computed as shown in equation (7) based on the current transmit PSD levels and the channel gains of all base stations in the active set of UE t on resource r. The rate R(t,q) achieved by UE t for candidate base station q may then be estimated as:

$$R(t, q) = \frac{\min\left(\sum_r SE(t, q, r) \cdot W(r), R_{BH}(q)\right)}{N(q) + 1}, \quad \text{Eq (11)}$$

where N(q) is the number of UEs currently served by candidate base station q (excluding UE t).

In equation (11), the numerator provides the overall rate achieved by UE t on all available resources for candidate base station q. Equation (11) is different from equation (6), which assumes that UE t is assigned each resource for a fraction of the time. The overall rate achieved by UE t on all available resources may be limited by the backhaul capacity of base station q. The overall rate may be divided by the number of UEs currently served by base station q plus one to account for UE t being handed over to base station q. The rate R(t,q) from equation (11) may be an estimated rate with UE t being assigned the same fraction of the available resource as other UEs currently served by base station q.

If candidate base station q is not serving any UE, then its current transmit PSD on all resources may be zero, and the rate estimate from equation (11) may be zero. This may be addressed in various manners. In one design, candidate base station q may compute and advertise the best initial resource $r_B(q)$, which may be determined based on a different utility function, e.g., a utility function with a nominal transmit PSD level being used on resource r. UE t may estimate its rate for candidate base station q by assuming that this resource will be assigned to UE t after association with base station q. This assumption may be used for only candidate base stations not serving any UEs.

The rate R(t,q) achieved by UE t for candidate base station q may be used to compute local metrics for base station q, which may in turn be used to make decisions on association and resource partitioning. As shown in equation (11), the rate R(t, q) may be affected by (i) other associations, which may affect N(q) for the number of UEs served by base station q, and (ii) resource partitioning, which may affect the spectral efficiency SE(t, q, r) achieved by UE t on each resource r. These effects may be included in performance evaluation/comparison, e.g., by updating associations after each resource partitioning update based on the new resource partitioning.

The rate in equation (11) may be used as a metric for initial association when UE t first accesses the wireless network. UE t may compute the estimated rate for each detectable base station. UE t may assume an infinite backhaul capacity for each base station for which this information is not available. UE t may access the base station with the highest estimated rate and may then become part of the scheduling forecast for that base station.

In one design, an adaptive algorithm may be used for joint association and resource partitioning. The algorithm is adaptive in that it can take into consideration the current operating scenario, which may be different for different parts of the wireless network and may also change over time. The adaptive algorithm may be performed by each base station in a distributed manner and may attempt to maximize the utility function over a set of base stations or possibly across the entire wireless network.

Figure 3:
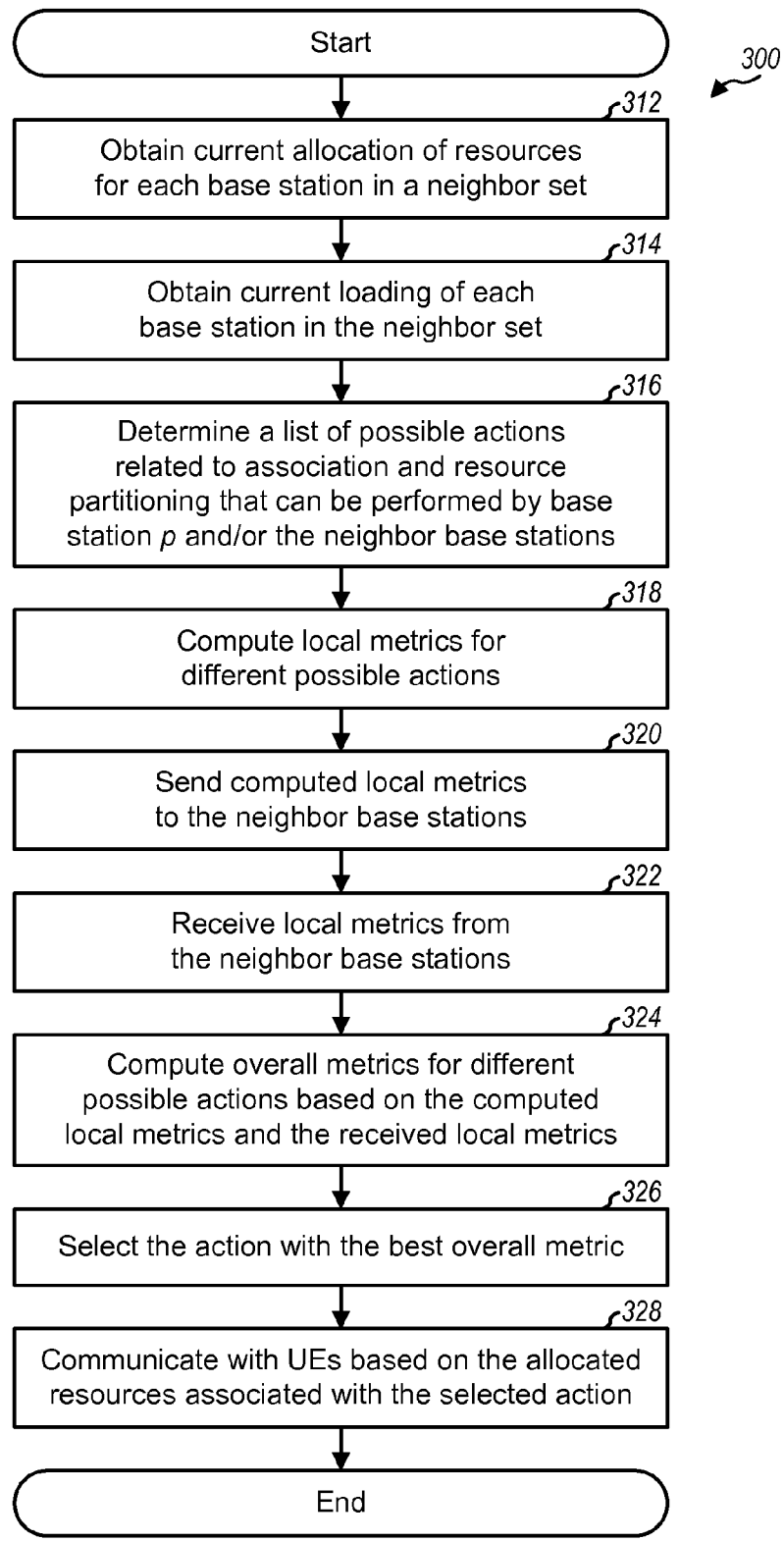
FIG. 3 shows a process for performing joint association and resource partitioning.

FIG. 3 shows a design of a process 300 for performing joint association and resource partitioning. Process 300 may be performed by each base station in a neighbor set for a distributed design. For clarity, process 300 is described below for base station p. Base station p may obtain the current allocation of resources for each base station in the neighbor set (step 312). For the downlink, the allocation of resources for a base station may be defined by a list of transmit PSD levels for the available resources, one transmit PSD level for each available resource. The transmit PSD level for each resource may indicate an allowed transmit PSD for the base station on the resource. Base station p may also obtain the current loading of each base station in the neighbor set (step 314). The loading of a base station may be defined by the number of UEs currently served by the base station, the percentage of resources used by the base station, etc. Base station p may obtain the current allocated resources and the current loading of the neighbor base stations via the backhaul or through other means. Base station p may also advertise its current allocated resources and/or loading via the backhaul to the neighbor base stations and possibly over the air for use by UEs for initial access or handover decisions.

Base station p may determine a list of possible actions related to association and resource partitioning that can be performed by base station p and/or neighbor base stations (step 316). A possible action may cover only association, or only resource partitioning, or both association and resource partitioning. A possible action for resource partitioning may cover a specific allocation of resources for base station p as well as a specific allocation of resources for each neighbor base station in the neighbor set. For example, a possible action for resource partitioning may entail base station p changing its transmit PSD on a particular resource and/or a neighbor base station changing its transmit PSD on the resource. A possible action for association and resource partitioning may cover a UE being handed over to a neighbor base station and a grant of an available resource (e.g., a higher transmit PSD level) to the neighbor base station. Some possible actions for association and resource partitioning are described below. The list of possible actions may include (i) standard actions that may be evaluated periodically without any explicit request and/or (ii) on-demand actions that may be evaluated in response to requests from neighbor base stations. The standard actions may involve one resource and either one or two base stations. The on-demand actions may involve UEs, allocations for more than one resource (e.g., for handover negotiation), and/or actions involving more than one neighbor base station (e.g., for resource partitioning). The list of possible actions may be denoted as A.

Base station p may compute local metrics for different possible actions (block 318). For example, a local metric based on the sum rate utility function in equation (1) may indicate an overall rate achieved by base station p for a particular action a and may be computed as follows:

$$U(p, a) = \sum_{S(t)=p} R(t, a), \quad \text{Eq (12)}$$

where R(t,a) is the rate achieved by UE t on all available resources for action a, and U(p,a) is a local metric for base station p for action a.

The rate R(t,a) for each UE may be computed as shown in equations (6) and (7), where PSD(p,r) and PSD(q,r) may be dependent on the lists of transmit PSD levels for base stations p and q, respectively, associated with possible action a. In general, the local metric for base station p for each possible action may be dependent on the utility function.

The local metrics for different possible actions may be used by base station p as well as the neighbor base stations to compute overall metrics for different possible actions. Base station p may send its computed local metrics U(p,a), for a∈A, to the neighbor base stations (block 320). Base station p may also receive local metrics U(q, a), for a∈A, from each neighbor base station q in the neighbor set (block 322). Base station p may compute overall metrics for different possible actions based on its computed local metrics and the received local metrics (block 324). For example, an overall metric based on the sum rate utility function in equation (1) may be computed for each possible action a, as follows:

$$V(a) = U(p, a) + \sum_{q \in NS(p) \setminus \{p\}} U(q, a), \quad \text{Eq (13)}$$

where V(a) is an overall metric for possible action a. The summation in equation (13) is over all neighbor base stations in the neighbor set except for base station p.

After completing the metric computation, base station p may select the action with the best overall metric (block 326). Each neighbor base station may similarly compute overall metrics for different possible actions and may also select the action with the best overall metric. Base station p and the neighbor base stations should select the same action if they operate on the same set of local metrics. Each base station may then operate based on the selected action, without having to communicate with one another regarding the selected action. However, base station p and its neighbor base stations may operate on different local metrics and may obtain different best overall metrics. This may be the case, for example, if base station p and its neighbor base stations have different neighbor sets. In this case, base station p may negotiate with the neighbor base stations to determine which action to take. This may entail exchanging overall metrics for some promising actions between the base stations and selecting the action that can provide good performance for as many base stations as possible.

The overall metrics for some possible actions may be close to one other, which may result in different possible actions being selected in different update intervals. In one design, hysteresis may be used to avoid toggling between different possible actions. For example, a new possible action may be selected only if its overall metric exceeds the overall metric of the current action by a particular amount. This particular amount may be a fixed value or a percentage of the overall metric.

Regardless of how the best action is selected, the selected action is associated with a specific allocation of resources for base station p and possibly specific association updates for base station p. Base station p may perform handovers of UEs based on the association updates, if any. Base station p may communicate with its UEs based on the resources allocated to base station p by the selected action (block 328). The allocated resources may be defined by a list of transmit PSD levels, one specific transmit PSD level for each available resource. Base station p may use the specified transmit PSD level for each available resource.

There may be a large number of possible actions to evaluate for an exhaustive search to find the best action. The number of possible actions to evaluate may be reduced in various manners. In one design, each available resource may be treated independently, and a given action may change the transmit PSD level of only one resource. In another design, the number of base stations that can adjust their transmit PSD levels on a given resource for a given action may be limited. In yet another design, the transmit PSD for a given base station on a given resource may be either increased or decreased by one level at a time. The number of possible actions may also be reduced via other simplifications.

In one design, a list of possible actions that may lead to good overall metrics may be evaluated. Possible actions that are unlikely to provide good overall metrics may be skipped in order to reduce computation complexity. For example, having both base station p and a neighbor base station increase their target transmit PSD levels on the same resource will likely result in extra interference on the resource, which may degrade performance for both base stations. This possible action may thus be skipped. As another example, having base station p hand out a UE to neighbor base station q and also claim a resource from base station q will likely result in a lower overall metric. This possible action may also be skipped.

Table 2 lists different types of actions for resource partitioning that may be evaluated, in accordance with one design.

TABLE 2

Action Types for Resource Partitioning

| Action Type | Description |
| --- | --- |
| p-C-r | Base station p claims resource r and increases its transmit PSD by one level on resource r. |
| p-B-r | Base station p blanks resource r and decreases its transmit PSD by one level on resource r. |
| p-R-r-Q | Base station p requests resource r from one or more neighbor base stations in set Q and asks the neighbor base station(s) in set Q to decrease their transmit PSD by one level on resource r. |
| p-G-r-Q | Base station p grants resource r to one or more neighbor base stations in set Q and tells the neighbor base station(s) in set Q to increase their transmit PSD by one level on resource r. |
| p-CR-r-Q | Base station p claims and requests resource r from one or more neighbor base stations in set Q and (i) increases its transmit PSD by one level on resource r and (ii) asks the neighbor base station(s) in set Q to decrease their transmit PSD by one level on resource r. |
| p-BG-r-Q | Base station p blanks and grants resource r to one or more neighbor base stations in set Q and (i) decreases its transmit PSD by one level on resource r and (ii) tells the neighbor base station(s) in set Q to increase their transmit PSD by one level on resource r. |

Each action type in Table 2 may be associated with a set of possible actions of that type. For each action type involving only base station p, K possible actions may be evaluated for K available resources. For each action type involving both base station p and one or more neighbor base stations in set Q, multiple possible actions may be evaluated for each available resource, with the number of possible actions being dependent on the size of the neighbor set, the size of set Q, etc. In general, set Q may include one or more neighbor base stations and may be limited to a small value (e.g., 2 or 3) in order to reduce the number of possible actions to evaluate.

Table 3 lists different types of actions for association and resource partitioning that may be evaluated, in accordance with one design. The first two rows of Table 3 cover action types for only association. The last two rows of Table 3 cover action types for both association and resource partitioning.

TABLE 3

Action Types for Association and Resource Partitioning

| Action Type | Description |
| --- | --- |
| p-HON-t-q | Base station p hands out UE t to neighbor base station q without granting any resources. |
| p-HIN-t-q | Base station p receives (or hands in) UE t from neighbor base station q without receiving any resources. |
| p-HOG-T-Q-R | Base station p hands out one or more UEs in set T to one or more neighbor base stations in set Q and also grants one or more resources in set R. |
| p-HIR-T-Q-R | Base station p receives one or more UEs in set T from one or more neighbor base stations in set Q and also requests one or more resources in set R. |

Each action type in Table 3 may be associated with a set of possible actions of that type. For the hand out or hand in action type involving only one UE t, L possible actions may be evaluated for L candidate UEs. The candidate UEs may be identified based on various metrics such as channel difference, relative strength, etc. Channel difference may be defined as the ratio of (i) a channel gain between a UE and a dominant interferer to (ii) a channel gain between the UE and a serving base station. The number of candidate UEs may be limited to reduce computation complexity. For example, L UEs with the L highest channel differences may be selected as candidate UEs. UEs located close to their serving base stations may be omitted from evaluation for association updates. Set Q may be limited to a small number of neighbor base stations, set T may be limited to a small number of candidate UEs, and set R may be limited to a small number of resources in order to reduce the number of possible actions to evaluate.

Tables 2 and 3 list some types of actions that may be evaluated for joint association and resource partitioning. Fewer, more and/or different action types may also be evaluated.

Base station p may compute a local metric for each possible action of each action type. Table 4 lists some local metrics that may be computed by base station p for different types of actions listed in Table 2.

TABLE 4

Local Metrics for Resource Partitioning

| Local metric | Description |
| --- | --- |
| $U_I(p, r)$ | Local metric for base station p if it increases its transmit PSD on resource r by one level. |
| $U_D(p, r)$ | Local metric for base station p if it decreases its transmit PSD on resource r by one level. |
| $U_{O/I}(p, q, r)$ | Local metric for base station p if neighbor base station q increases its transmit PSD on resource r by one level. |
| $U_{O/D}(p, q, r)$ | Local metric for base station p if neighbor base station q decreases its transmit PSD on resource r by one level. |
| $U_{I/D}(p, q, r)$ | Local metric for base station p if it increases its transmit PSD on resource r by one level and neighbor base station q decreases its transmit PSD on resource r by one level. |
| $U_{D/I}(p, q, r)$ | Local metric for base station p if it decreases its transmit PSD on resource r by one level and neighbor base station q increases its transmit PSD on resource r by one level. |
| $U_{O/I/D}(p, n, Q, r)$ | Local metric for base station p if neighbor base station n increases its transmit PSD on resource r by one level and one or more neighbor base stations in set Q decrease their transmit PSD on resource r by one level. |
| $U_{O/D/I}(p, n, Q, r)$ | Local metric for base station p if neighbor base station n decreases its transmit PSD on resource r by one level and one or more neighbor base stations in set Q increase their transmit PSD on resource r by one level. |

Table 5 lists some local metrics that may be computed by base station p or neighbor base station q for different types of actions listed in Table 3.

TABLE 5

Local Metrics for Association and Resource Partitioning

| Local metric | Description |
| --- | --- |
| $U_{HO}(p, t)$ | Local metric for base station p after handing out UE t. |
| $U_{HI}(p, t)$ | Local metric for base station p after handing in UE t. |
| $U_{HO}(p, T, Q, R)$ | Local metric for base station p after handing out one or more UEs in set T and giving up one or more resources in set R to one or more neighbor base stations in set Q. |
| $U_{HI}(p, T, Q, R)$ | Local metric for base station p after receiving one or more UEs in set T and one or more resources in set R from one or more neighbor base stations in set Q. |
| $U_{HO}(q, p, T, Q, R)$ | Local metric for base station q after handing out one or more UEs in set T to base station p, which also receives one or more resources in set R from one or more base stations in set Q. |
| $U_{HI}(q, p, T, Q, R)$ | Local metric for base station q after receiving one or more UEs in set T from base station p, which also gives up one or more resources in set R to one or more base stations in set Q. |
| $U_H(n, P, Q, R)$ | Local metric for base station n if one or more base stations in set P give up one or more resources in set R to one or more base stations in set Q. |

Tables 4 and 5 list some local metrics that may be computed for joint association and resource partitioning. Fewer, more and/or different local metrics may also be computed.

Base station p may compute local metrics for different possible actions based on (i) pilot measurements from UEs having base station p in their active sets and (ii) the allocated resources (e.g., the lists of transmit PSD levels) for base station p and neighbor base stations associated with these possible actions. For each possible action, base station p may first compute the spectral efficiency R(t, r) achieved by each UE served by base station p on each resource r, e.g., as shown in equation (7). The computation of the spectral efficiency R(t,r) may be dependent on a scheduling forecast to obtain the α(t,r) values. PSD(p,r) and PSD(q,r) in equation (7) may be obtained from the lists of transmit PSD levels for base stations p and q, respectively. G(p,t) and G(q, t) is equation (7) may be obtained from pilot measurements from UE t for base stations p and q, respectively. A rate may be computed for each UE based on the spectral efficiencies for the UE on all available resources, e.g., as shown in equation (6). A local metric for the possible action may then be computed based on the rates for all UEs, e.g., as shown in equation (1) for the sum rate utility function.

Base station p may exchange local metrics with the neighbor base stations in the neighbor set (e.g., via the backhaul) to enable each base station to compute overall metrics for different possible actions. In one design, local metrics for possible actions involving only base station p may be sent to all neighbor base stations in the neighbor set. Local metrics for possible actions involving neighbor base station q may be sent to only base station q. Local metrics for possible actions involving neighbor base stations in set Q may be sent to each base station in set Q.

In one design, some local metrics may be computed periodically and exchanged between the base stations in the neighbor set. In one design, remaining local metrics may be computed when requested and exchanged via on-demand messages.

Base station p may compute local metrics for different possible actions and may also receive local metrics for different possible actions from neighbor base stations. Base station p may compute overall metrics for different possible actions based on the computed local metrics and the received local metrics. The local metrics and the overall metrics may be dependent on the selected utility function. For clarity, the description below assumes the utility function shown in equation set (1).

In one design, an overall metric $V_C(p,r)$ for a p-C-r action may be computed as follows:

$$V_C(p, r) = U_I(p, r) + \sum_{q \in NS(p) \setminus \{p\}} U_{O/I}(q, p, r), \qquad \text{Eq (14)}$$

where local metric $U_I(p,r)$ may be computed by base station p, and local metric $U_{O/I}(q,p,r)$ may be received from neighbor base stations.

In one design, an overall metric $V_B(p,r)$ for a p-B-r action may be computed as follows:

$$V_B(p, r) = U_D(p, r) + \sum_{q \in NS(p) \setminus \{p\}} U_{O/D}(q, p, r), \qquad \text{Eq (15)}$$

where local metrics $U_D(p,r)$ may be computed by base station p, and local metrics $U_{O/D}(q,p,r)$ may be received from neighbor base stations.

In one design, an overall metric $V_G(p,Q,r)$ for a p-G-r-Q action may be computed as follows:

$$V_G(p, Q, r) = \sum_{n \in NS(p)} U_{O/I}(n, Q, r) + \sum_{q \in Q}\left( \begin{array}{c} V_C(q, r) - \\ \sum_{n \in N1} U_{O/I}(n, q, r) \end{array} \right), \qquad \text{Eq (16)}$$

where $N1 = NS(p) \cap NS(q)$. In equation (16), local metrics $U_{O/I}(n,q,r)$ and $U_{O/I}(n,Q,r)$ may be received from the neighbor base stations. An overall metric for a p-R-r-Q action may be computed in similar manner as an overall metric for a p-G-r-Q action.

In one design, an overall metric $V_{BG}(p,Q,r)$ for a p-BG-r-Q action may be computed as follows:

$$V_{BG}(p, Q, r) = \sum_{n \in NS(p)} U_{O/D/I}(n, p, Q, r) + \sum_{q \in Q}\left( \begin{array}{c} V_C(q, r) - \\ \sum_{n \in N1} U_{O/I}(n, q, r) \end{array} \right), \qquad \text{Eq (17)}$$

where local metrics $U_{O/I}(n,q,r)$ and $U_{O/D/I}(n,p,Q,r)$ may be received from the neighbor base stations. An overall metric for a p-CR-r-Q action may be computed in similar manner as an overall metric for a p-BG-r-Q action.

In one design, an overall metric $V_{HON}(p,t,q)$ for a p-HON-t-q action may be computed as follows:

$$V_{HON}(p,t,q) = U_{HO}(p,t) + U_{HI}(q,t), \qquad \text{Eq (18)}$$

where local metric $U_{HO}(p, t)$ may be computed by base station p, and local metric $U_{HI}(q,t)$ may be received from neighbor base station q. Equation (18) may be used if UE t is not the first UE that will be served by base station q. If UE t is the first UE, then the overall metric $V_{HON}(p,t,q)$ may be computed based on an assumption that UE t will be assigned the best initial resource $r_B(q)$, with base station q using the nominal transmit PSD level on this resource, as described above.

In one design, an overall metric $V_{HOG}(p,T,Q,R)$ for a p-HOG-T-Q-R action may be computed as follows:

$$V_{HOG}(p, T, Q, R) = U_{HO}(p, T, Q, R) + \sum_{n \in N2} U_H(n, \{p\}, Q, R) + \sum_{q \in Q}\left( \begin{array}{c} U_{HI}(q, p, T, Q, R) + V_C(q, R) - \\ \sum_{n \in N1} U_{O/I}(n, q, R) \end{array} \right), \qquad \text{Eq (19)}$$

where $N2 = NS(p) \setminus (Q \cup \{p\})$. Local metrics $U_{HO}(p,T,Q,R)$ may be computed by base station p. Local metrics $U_H(n,\{p\}, Q,R)$, $U_{HI}(q,p,T,Q,R)$ and $U_{O/I}(n,q,R)$ and overall metric $V_C(q,R)$ may be received from neighbor base stations.

In one design, an overall metric $V_{HIR}(p,T,Q,R)$ for a p-HIR-T-Q-R action may be computed as follows:

$$V_{HIR}(p, T, Q, R) = U_{HI}(p, T, Q, R) + \sum_{n \in N2} U_H(n, Q, \{p\}, R) + \sum_{q \in Q}\left( \begin{array}{c} U_{HO}(q, p, T, Q, R) + V_B(q, R) - \\ \sum_{n \in N1} U_{O/D}(n, q, R) \end{array} \right). \qquad \text{Eq (20)}$$

Local metrics $U_{HI}(p,T,Q,R)$ may be computed by base station p. Local metrics $U_H(n,Q,\{p\},R)$, $U_{HO}(q,p,T,Q,R)$ and $U_{O/D}(n,q,R)$ and overall metric $V_B(q,R)$ may be received from neighbor base stations.

Equations (14) through (20) show an exemplary set of computations for overall metrics for different types of actions in Tables 2 and 3. Some overall metrics may be computed based solely on local metrics, e.g., as shown in equations (14), (15) and (18). Other overall metrics may be computed based on a combination of local metrics and overall metrics, e.g., as shown in equations (16), (17), (19) and (20). The use of some overall metrics to compute other overall metrics may simplify computation. In general, an overall metric may be computed based solely on local metrics or based on both local metrics and other overall metrics. The base stations may exchange local metrics and/or overall metrics via one or more rounds of messages.

The overall metrics may also be computed in other manners, e.g., based on other equations, other local metrics, etc. In another design, a change in an overall metric may be computed instead of, or in addition to, the overall metric. The changes in the overall metrics (instead of the overall metrics) for different possible actions may be compared to select the best action. In general, any set of action types may be supported. The overall metrics and/or their changes may be computed for the supported action types and may be defined in various manners.

For clarity, joint association and resource partitioning has been specifically described for the downlink. Joint association and resource partitioning may also be performed for the uplink. However, resource partitioning and rate computation may be performed in different manners for the uplink than the downlink.

In one design, available resources for the uplink may be allocated to base stations by assigning each base station with a list of target interference-over-thermal (IoT) levels for the available resources, one target IoT level for each resource. A target IoT level for base station p on resource r may indicate an amount of interference expected by base station p on resource r. Neighbor base stations may control uplink transmissions from their UEs on resource r such that the total interference caused by these UEs is maintained at or below the target IoT level on resource r at base station p. Correspondingly, base station p may control uplink transmissions from its UEs on each resource such that the interference caused by these UEs is maintained at or below the target IoT level for each neighbor base station on that resource.

In one design, a list of target IoT levels for base station p may be mapped to a list of target interference levels, as follows:

$$I_{target}(p, r) = \frac{IoT_{target}(p, r) - 1}{N_{neighbor}(p, r)}, \quad \text{Eq (21)}$$

where $IoT_{target}(p,r)$ is a target IoT level for base station p on resource r, $I_{target}(p,r)$ is a target interference level for base station p on resource r for each neighbor base station, and $N_{neighbor}(p,r)$ is the number of neighbor base stations that use resource r.

In equation (21), the numerator gives the total interference observed by base station p on resource r by subtracting 1 for thermal noise from the target IoT level. The total interference is given in thermal noise units. The total interference is divided by the number of neighbor base stations using resource r to obtain the target interference level for base station p on resource r for each neighbor base station. For example, the target IoT level for base station p on resource r may be 6 decibels (dB) and may correspond to an expected total noise and interference that is four times thermal noise. The expected total interference on resource r may be three thermal noise units. If base station p has three neighbor base stations using resource r, then the expected interference from each neighbor base station on resource r may be one thermal noise unit. Each neighbor base station may control uplink transmissions from its UEs such that these uplink transmissions will be at or below the target interference level for that neighbor base station at base station p.

Base station p may obtain a list of target IoT levels for each neighbor base station and may determine a list of target interference levels for that neighbor base station. For each UE served by base station p, a set of transmit PSD levels may be computed for each resource based on the target interference levels for all neighbor base stations in the active set of the UE, as follows:

$$PSD(t, q, r) = \frac{I_{target}(q, r) \cdot N_0}{G(q, t)}, \quad \text{Eq (22)}$$

where $I_{target}(q,r)$ is a target interference level for neighbor base station q on resource r, which is determined by the target IoT level for base station q on resource r, and $PSD(t,q,r)$ is a transmit PSD level for UE t on resource r that can meet the target interference level for neighbor base station q on resource r.

The transmit PSD level for UE t on each resource may be selected as follows:

$$PSD(t, r) \leq \min_{q \in AS(t), q \neq S(t)} \{PSD(t, q, r)\}. \quad \text{Eq (23)}$$

A set of transmit PSD levels may be obtained for all neighbor base stations in the active set of UE t for resource r, as shown in equation (22). The smallest transmit PSD level in the set may be selected as the transmit PSD level for UE t on resource r. This would ensure that the interference caused by UE t on resource r will not exceed the target interference level for any neighbor base station on resource r.

The transmit PSD levels for UE t on all resources may be limited by the maximum transmit power level $P_{max}(t)$ of UE t, as follows:

$$\sum_r PSD(t, r) \cdot W(r) \leq P_{max}(t). \quad \text{Eq (24)}$$

The spectral efficiency SE(t,r) of UE t on resource r may be estimated based on an assumption that serving base station p will observe the target IoT level on resource r, as follows:

$$SE(t, r) = C\left(\frac{PSD(t, r) \cdot G(p, t)}{N_0 \cdot IoT_{target}(p, r)}\right). \quad \text{Eq (25)}$$

In equation (25), the numerator within the parenthesis denotes the desired received power for UE t at serving base station p. The denominator denotes the expected total noise and interference at serving base station p. As shown in equation (25), the spectral efficiency of UE t on resource r is dependent on (i) the transmit PSD for UE t on resource r, which is dependent on the target IoT levels for the neighbor base stations on resource r, and (ii) the target IoT level for base station p on resource r. The target IoT levels thus affect both the numerator and denominator in equation (25). The rate R(t) that UE t can achieve on all resources may be computed as shown in equation (6).

The processing for joint association and resource partitioning and the metric computation described above for the downlink may also be used for the uplink with some modifications. First, a list of transmit PSD levels for each base station on the downlink may be replaced with a list of target IoT levels for each base station on the uplink. Second, the spectral efficiencies of UEs on the uplink may be computed based on equation (21) through (25) instead of equation (7). FIG. 3 may be used for joint association and resource partitioning for the uplink with the modifications described above. The computation of the local and overall metrics described above for the downlink may also be used for the uplink.

Joint association and resource partitioning may be performed independently for the downlink and uplink, as described above. This may be applicable when UEs can be served by different base stations on the downlink and uplink. If each UE can be served by only one base station for both the downlink and uplink, then association may affect the local and overall metrics of both the downlink and uplink. In this case, joint association and resource partitioning may be performed together for both the downlink and uplink.

In one design, overall metrics may be computed separately for the downlink and uplink for a list of possible actions. A composite metric $V_C(a)$ may be computed for each possible action a based on an overall metric $V_{DL}(a)$ for the downlink and an overall metric $V_{UL}(a)$ for the uplink for possible action a, as follows:

$$V_C(a)=V_{DL}(a)+V_{UL}(a). \quad \text{Eq (26)}$$

Changes in the overall metrics (instead of the overall metrics) for the downlink and uplink may also be added to obtain a change in the composite metric. The rates, local metrics, and/or overall metrics for the downlink and uplink may also be scaled to give appropriate weights for the two links, e.g., so that the difference in the average rates of the downlink and uplink does not bias decisions based on the overall metric for one link at the expense of severe degradation on the other link. Decisions on association and resource partitioning may be made based on the composite metrics (instead of the overall metrics) for different possible actions.

In one design, joint association and resource partitioning may be performed for all available resources for the downlink and/or uplink. In another design, joint association and resource partitioning may be performed for a subset of the available resources. For example, macro base stations may be allocated a first subset of the available resources and pico base stations may be allocated a second subset of the available resources based on fixed resource partitioning. The remaining available resources may be dynamically allocated to the macro and pico base stations based on joint association and resource partitioning.

In general, the techniques described herein may be used for only adaptive association, or only adaptive resource partitioning, or adaptive joint association and resource partitioning. For adaptive association, associations for UEs may be updated based on rates and metrics computed based on the current allocation of resources for each base station. For adaptive resource partitioning, the available resources may be allocated to base stations based on the current loading of each base station, without consideration updates in association. For joint association and resource partitioning, both association and resource allocation may be performed together to update associations for UEs and to allocate the available resources to base stations. Different lists of possible actions may be evaluated for only adaptive association, or only adaptive resource partitioning, or adaptive joint association and resource partitioning. The rates and metrics may be computed in similar manner for all three cases.

The techniques described herein may improve overall performance for association and resource partitioning. The techniques may be used for various wireless networks and may be especially beneficial for a heterogeneous network with different types of base stations. For example, a UE communicating with a macro base station may be handed over to a pico base station, and some resources may be allocated to the pico base station concurrently with the handover of the UE to allow the pico base station to serve the UE.

The techniques described herein may provide better performance over a UE-based server selection scheme in which a UE selects a serving base station. The UE may not be able to detect the presence or absence of far away base stations, which may then affect the choice of the serving base station for the UE. The UE may not be aware of the presence or absence of other UEs in neighbor cells (and their locations), which may also affect the choice of the serving base station. The UE may also be unable to take into account updates in resource partitioning caused by association decision of the UE. The techniques described herein may be able to overcome these limitations of the UE-based server selection scheme.

Figure 4:
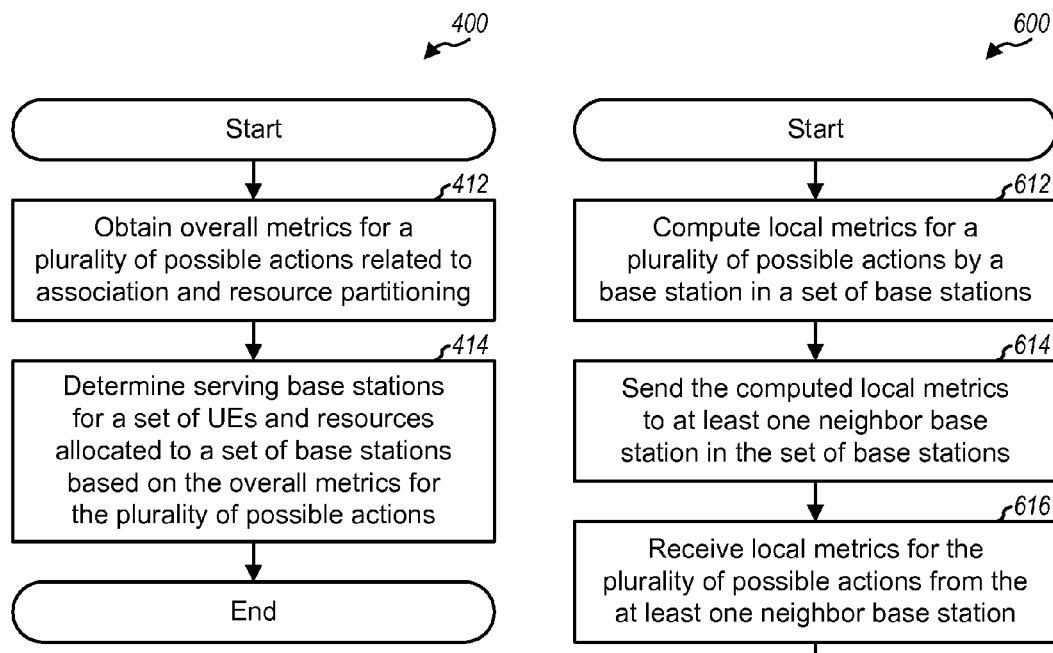
FIGS. 4 and 5 show a process and an apparatus, respectively, for supporting communicating with joint association and resource partitioning.

FIG. 4 shows a design of a process 400 for supporting communication. Process 400 may be performed by a base station (as described below), a designated entity, or some other entity. The base station may obtain overall metrics for a plurality of possible actions related to association and resource partitioning (block 412). The base station may determine serving base stations for a set of UEs and resources allocated to a set of base stations based on the overall metrics for the plurality of possible actions (block 414).

The plurality of possible actions may comprise association-only actions related to only association. Each association-only action may cover handover of at least one UE between base stations in the set of base stations. For example, the association-only actions may comprise (i) possible actions for handing out UEs from the base station to neighbor base stations and/or (ii) possible actions for handing in UEs from the neighbor base stations to the base station, without changing resource allocation for the set of base stations, e.g., as shown by the first two rows of Table 3. The plurality of possible actions may also comprise partitioning-only actions related to only resource partitioning, e.g., as shown in Table 2. Each partitioning-only action may cover allocation of at least one resource to at least one base station in the set of base stations.

The plurality of possible actions may also comprise joint actions related to both association and resource partitioning. Each joint action may cover handover of at least one UE between base stations and allocation of at least one resource to at least one base station. For example, the joint actions may comprise (i) possible actions for handing out UEs and granting resources to neighbor base stations and/or (ii) possible actions for handing in UEs and requesting resources from the neighbor base stations, e.g., as shown by the last two rows of Table 3.

The available resources may be for time units, frequency units, time-frequency units, etc. In one design, the available resources may be for the downlink. In this design, each possible action may be associated with a list of transmit PSD levels for each base station in the set of base stations, one transmit PSD level for each available resource. In another design, the available resources may be for the uplink. In this design, each possible action may be associated with a list of target IoT levels for each base station in the set of base stations, one target IoT level for each available resource. A resource may be allocated to a base station by changing the transmit PSD level (for the downlink) or the target IoT level (for the uplink) of the base station on the resource.

Figure 5:
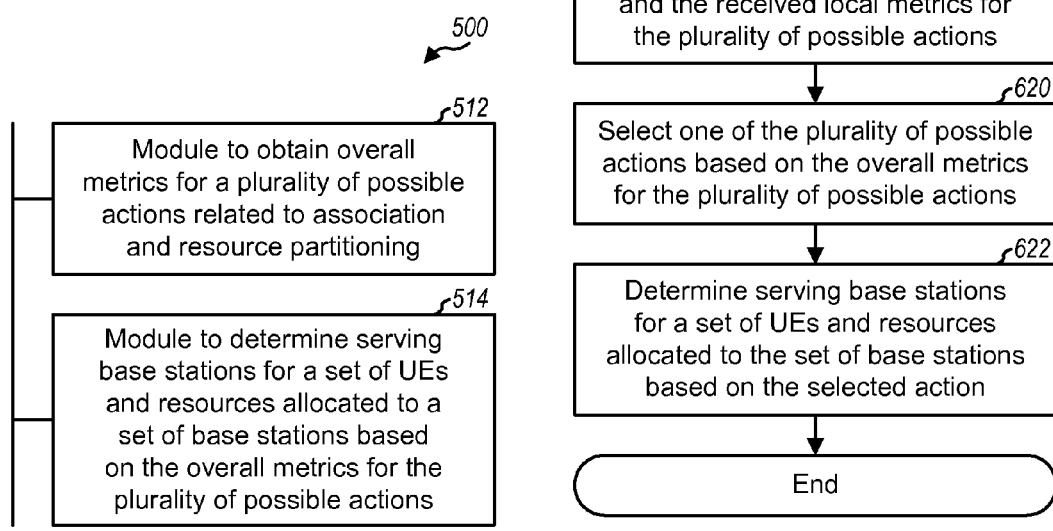

FIG. 5 shows a design of an apparatus 500 for supporting communication. Apparatus 500 includes a module 512 to obtain overall metrics for a plurality of possible actions related to association and resource partitioning, and a module 514 to determine serving base stations for a set of UEs and resources allocated to a set of base stations based on the overall metrics for the plurality of possible actions.

Figure 6:
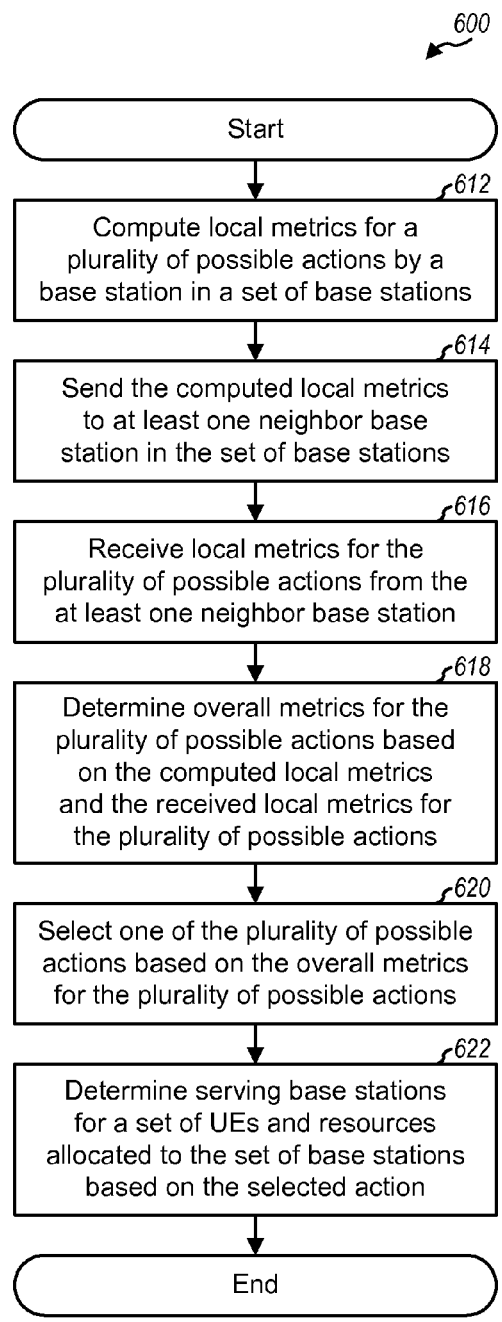
FIG. 6 shows another process for performing joint association and resource partitioning.

FIG. 6 shows a design of a process 600 for performing joint association and resource partitioning, which may be used for blocks 412 and 414 in FIG. 4. A base station may compute local metrics for a plurality of possible actions related to association and resource partitioning (block 612). The base station may send the computed local metrics to at least one neighbor base station in a set of base stations to enable the neighbor base station(s) to compute overall metrics for the plurality of possible actions (block 614). The base station may receive local metrics for the plurality of possible actions from the at least one neighbor base station (block 616). The base station may determine overall metrics for the plurality of possible actions based on the computed local metrics and the received local metrics for these possible actions (block 618). For each possible action, the base station may combine a local metric computed by the base station for the possible action with at least one local metric received from the at least one neighbor base station for the possible action to obtain an overall metric for that possible action, e.g., as shown in equation (13). A local metric for a possible action may be indicative of the performance achieved by a base station for the possible action. An overall metric for a possible action may be indicative of the overall performance achieved by the set of base stations for the possible action.

The base station may select one of the plurality of possible actions based on the overall metrics for these possible actions (block 620). The base station may determine serving base stations for a set of UEs and resources allocated to the set of base stations based on the selected action (block 622).

In one design of block 612, the base station may compute a local metric for each possible action as follows. The base station may determine allocation of available resources to the set of base stations for the possible action. For example, the base station may determine (i) a list of transmit PSD levels for each base station for the downlink or (ii) a list of target IoT levels for each base station for the uplink. The base station may determine at least one rate for at least one UE communicating with the base station based on the allocation of the available resources to the set of base stations. The base station may then determine the local metric for the possible action based on the at least one rate for the at least one UE, e.g., based on any one of equation sets (1) through (5). In general, the local metric for each possible action may be computed based on a function of rate, or latency, or queue size, or some other parameter, or a combination thereof. The local metric for each possible action may also be computed based on a function of sum of rates, or minimum of rates, or sum of quantities determined based on rates, etc.

For the downlink, the base station may determine a rate for a UE served by the base station based on the list of transmit PSD levels for each base station and a channel gain between the UE and each base station in the set of base stations, e.g., as shown in equations (6) and (7). For the uplink, the base station may determine a rate for a UE served by the base station based on the list of target IoT levels for each base station in the set of base stations and the channel gain between the UE and the base station, e.g., as shown in equations (25) and (6). For handover, the base station may determine a rate for a UE being handed over from a neighbor base station to the base station based on the number of UEs being served by the base station and the current or new/proposed allocation of the available resources to the set of base stations, e.g., as shown in equation (11).

In one design, joint association and resource partitioning may be performed for only the downlink or only the uplink. In this case, the rates and metrics may be computed based on association and resource partitioning for only the downlink or only the uplink. In another design, joint association and resource partitioning may be performed for both the downlink and uplink. In this case, the base station may obtain (i) a first set of overall metrics for a first set of possible actions related to association and resource partitioning for the downlink and (ii) a second set of overall metrics for a second set of possible actions related to association and resource partitioning for the uplink. The base station may determine the serving base stations for the set of UEs, the resources allocated to the set of base stations for the downlink, and the resources allocated to the set of base stations for the uplink based on the first and second sets of overall metrics for the first and second sets of possible actions. Each UE may be served by a single base station for both the downlink and uplink.

The description above is for a distributed design in which each base station in the set of base stations may compute and exchange local and overall metrics for different possible actions. For a centralized design, a designated entity may compute local and overall metrics for different possible actions and may select the best action.

Figure 7:
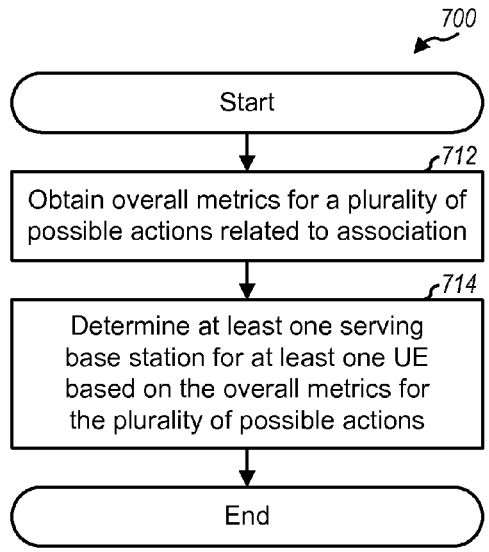
FIGS. 7 and 8 show a process and an apparatus, respectively, for supporting communicating with adaptive association.

FIG. 7 shows a design of a process 700 for supporting communication. Process 700 may be performed by a base station (as described below), a designated entity, or some other entity. The base station may obtain overall metrics for a plurality of possible actions related to association (block 712). The plurality of possible actions may comprise (i) possible actions for handing out one or more UEs from the base station to neighbor base stations, (ii) possible actions for handing in one or more UEs from the neighbor base stations to the base station, and/or (iii) other possible actions related to association. The base station may determine at least one serving base station for at least one UE based on the overall metrics for the plurality of possible actions (block 714).

In one design of block 712, the base station may compute local metrics for the plurality of possible actions and may also receive local metrics for the plurality of possible actions from at least one neighbor base station. To compute a local metric for a possible action with one or more UEs being handed in to the base station, the base station may (i) determine a rate for each UE being handed in to the base station based on the number of UEs being served by the base station and the current allocation of available resources to the set of base stations and (ii) determine the local metric for the possible action based on the rate for each UE being handed in to the base station. The base station may determine the overall metrics for the plurality of possible actions based on the computed local metrics and the received local metrics for the plurality of possible actions.

In one design, association may be performed for only the downlink or only the uplink. In this case, the rates and metrics may be computed based on association for only the downlink or only the uplink and may assume the current resource partitioning. In another design, association may be performed for both the downlink and uplink. In this case, the base station may obtain (i) a first set of overall metrics for a first set of possible actions related to association for the downlink and (ii) a second set of overall metrics for a second set of possible actions related to association for the uplink. The base station may then determine the at least one serving base station for the at least one UE based on the first and second sets of overall metrics. Each UE may be served by a single base station for both the downlink and uplink.

Figure 8:
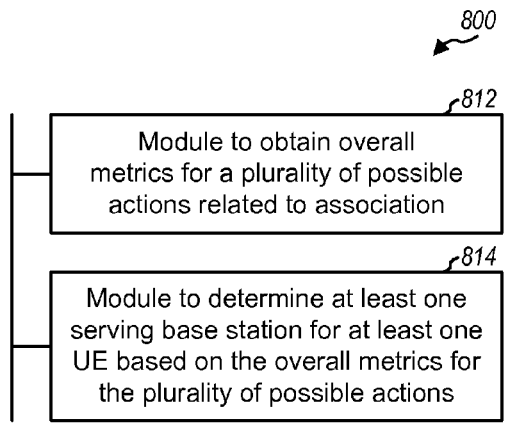

FIG. 8 shows a design of an apparatus 800 for supporting communication. Apparatus 800 includes a module 812 to obtain overall metrics for a plurality of possible actions related to association, and a module 814 to determine at least one serving base station for at least one UE based on the overall metrics for the plurality of possible actions.

Figure 9:
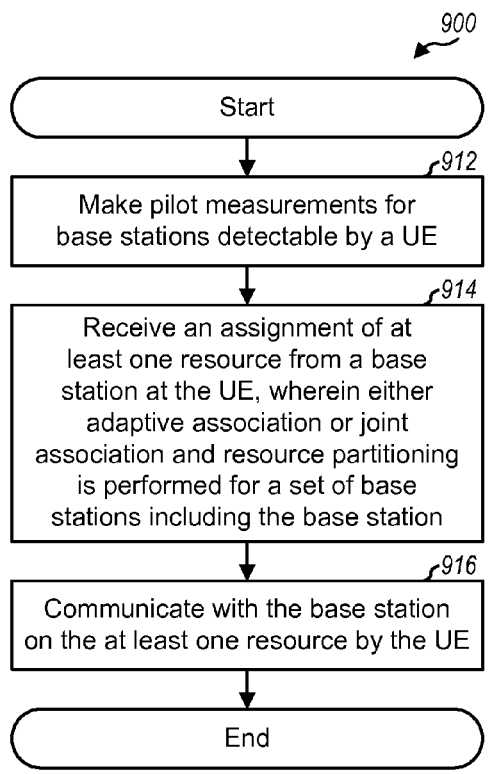
FIGS. 9 and 10 show a process and an apparatus, respectively, for communicating by a UE.

FIG. 9 shows a design of a process 900 for communicating in a wireless network with joint association and resource partitioning. Process 900 may be performed by a UE (as described below) or by some other entity. The UE may make pilot measurements for base stations detectable by the UE (block 912). The pilot measurements may be used to determine an active set for the UE, to compute metrics for adaptive association, to compute metrics for joint association and resource partitioning, and/or for other purposes.

The UE may receive an assignment of at least one resource from a base station (block 914). In one design, adaptive association may be performed to determine serving base stations for a set of UEs including the UE. In this design, the base station may be allocated a subset of the available resources by some means. In another design, joint association and resource partitioning may be performed to determine serving base stations for a set of UEs including the UE and to allocate available resources to a set of base stations including the base station. In this design, the base station may be allocated a subset of the available resources by the joint association and resource partitioning. For both designs, the at least one resource assigned to the UE may be from the subset of the available resources allocated to the base station.

The UE may communicate with the base station on the at least one resource (block 916). In one design, for the downlink, the UE may receive data transmission on the at least one resource from the base station. The data transmission may be sent by the base station on each of the at least one resource at a transmit PSD level allowed for the base station on the resource. In another design, for the uplink, the UE may send data transmission on the at least one resource to the base station. The data transmission may be sent by the UE on each of the at least one resource at a transmit power level determined based on at least one IoT level for at least one neighbor base station on the resource.

Figure 10:
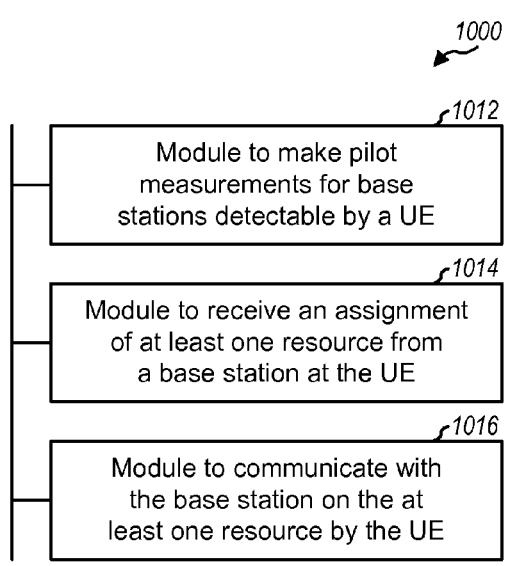

FIG. 10 shows a design of an apparatus 1000 for supporting communication. Apparatus 1000 includes a module 1012 to make pilot measurements for base stations detectable by a UE, a module 1014 to receive an assignment of at least one resource from a base station at the UE, wherein either adaptive association or joint association and resource partitioning is performed for a set of base stations including the base station, and a module 1016 to communicate with the base station on the at least one resource by the UE.

The modules in FIGS. 5, 8 and 10 may comprise processors, electronic devices, hardware devices, electronic components, logical circuits, memories, software codes, firmware codes, etc., or any combination thereof.

Figure 11:
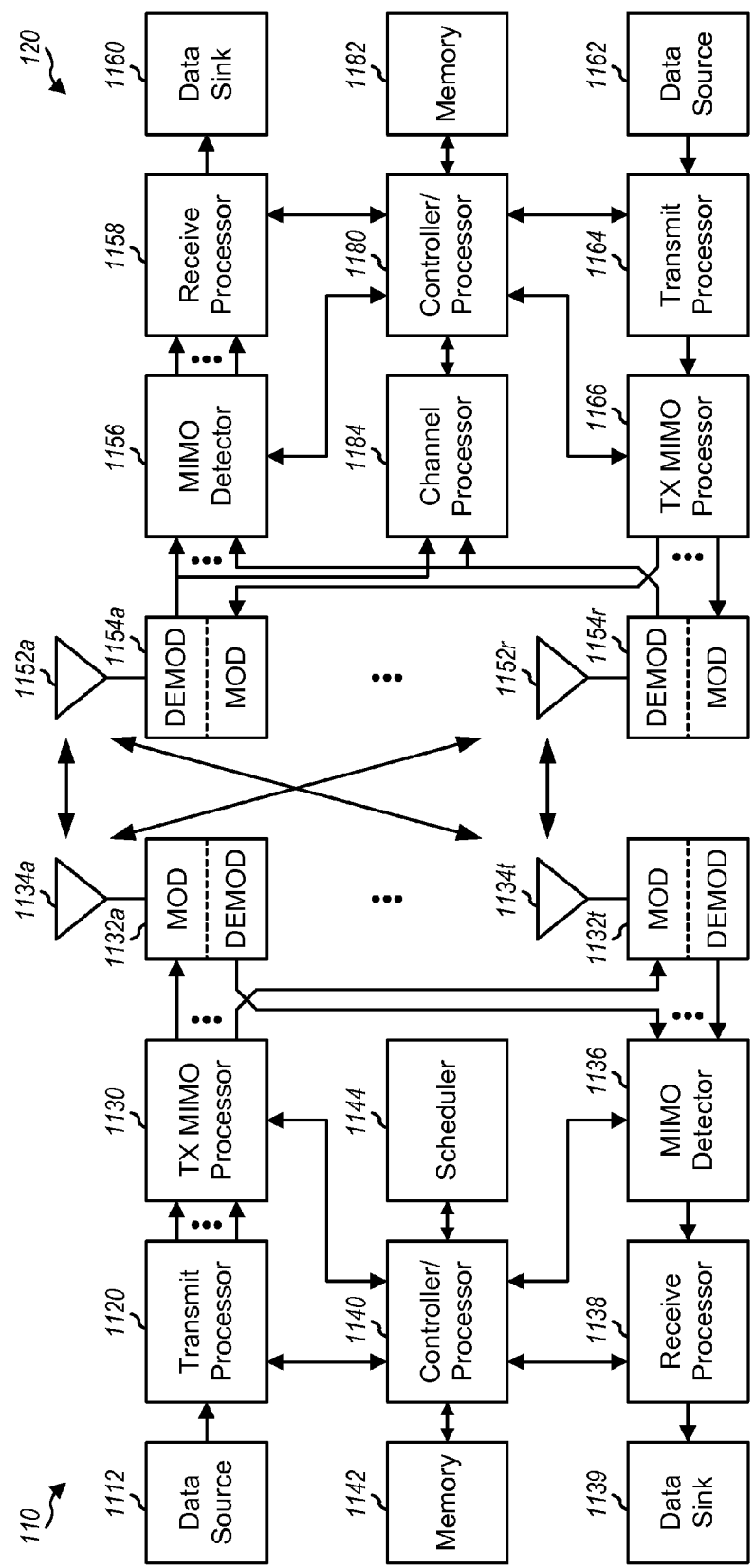
FIG. 11 shows a block diagram of a base station and a UE.

FIG. 11 shows a block diagram of a design of a base station 110 and a UE 120, which may be one of the base stations and one of the UEs in FIG. 1. Base station 110 may be equipped with T antennas 1134a through 1134t, and UE 120 may be equipped with R antennas 1152a through 1152r, where in general T≥1 and R≥1.

At base station 110, a transmit processor 1120 may receive data from a data source 1112 for one or more UEs and control information from a controller/processor 1140. Processor 1120 may process (e.g., encode, interleave, and modulate) the data and control information to obtain data symbols and control symbols, respectively. Processor 1120 may also generate pilot symbols for pilot or reference signal. A transmit (TX) multiple-input multiple-output (MIMO) processor 1130 may perform spatial processing (e.g., precoding) on the data symbols, the control symbols, and/or the pilot symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and may provide received signals to demodulators (DEMODs) 1154a through 1154r, respectively. Each demodulator 1154 may condition (e.g., filter, amplify, downconvert, and digitize) its received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate, deinterleave, and decode) the detected symbols, provide decoded data for UE 120 to a data sink 1160, and provide decoded control information to a controller/processor 1180.

On the uplink, at UE 120, a transmit processor 1164 may receive and process data from a data source 1162 and control information from controller/processor 1180. Processor 1164 may also generate pilot symbols for pilot or reference signal. The symbols from transmit processor 1164 may be precoded by a TX MIMO processor 1166 if applicable, further processed by modulators 1154a through 1154r (e.g., for SC-FDM, OFDM, etc.), and transmitted to base station 110. At base station 110, the uplink signals from UE 120 may be received by antennas 1134, processed by demodulators 1132, detected by a MIMO detector 1136 if applicable, and further processed by a receive processor 1138 to obtain decoded data and control information sent by UE 120. Processor 1138 may provide the decoded data to a data sink 1139 and the decoded control information to controller/processor 1140.

Controllers/processors 1140 and 1180 may direct the operation at base station 110 and UE 120, respectively. A channel processor 1184 may make pilot measurements, which may be used to determine an active set for UE 120 and to compute channel gains, rates, metrics, etc. Processor 1140 and/or other processors and modules at base station 110 may perform or direct process 300 in FIG. 3, process 400 in FIG. 4, process 600 in FIG. 6, process 700 in FIG. 7, and/or other processes for the techniques described herein. Processor 1180 and/or other processors and modules at UE 120 may perform or direct process 900 in FIG. 9 and/or other processes for the techniques described herein. Memories 1142 and 1182 may store data and program codes for base station 110 and UE 120, respectively. A scheduler 1144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining overall metrics for a plurality of possible actions related to association and resource partitioning, wherein each overall metric is indicative of an overall performance level of a set of base stations resulting from one of a given association-only action, a given resource partitioning-only action, or a given association and resource partitioning action; and
   determining serving base stations for a set of user equipments (UEs) and resources allocated to the set of base stations based on the overall metrics for the plurality of possible actions.

2. The method of claim 1, wherein the plurality of possible actions comprise association-only actions related to only association, each association-only action covering handover of at least one UE between base stations in the set of base stations, without changing resource allocation for the set of base stations.

3. The method of claim 1, wherein the plurality of possible actions comprise partitioning-only actions related to only resource partitioning, each partitioning-only action covering allocation of at least one resource to at least one base station in the set of base stations.

4. The method of claim 1, wherein the plurality of possible actions comprise joint actions related to both association and resource partitioning, each joint action covering handover of at least one UE between base stations in the set of base stations and allocation of at least one resource to at least one base station in the set of base stations.

5. The method of claim 1, wherein the available resources are for downlink, and wherein each possible action is associated with a list of transmit power spectral density (PSD) levels for each base station in the set of base stations, one transmit PSD level for each available resource.

6. The method of claim 1, wherein the available resources are for uplink, and wherein each possible action is associated with a list of target interference-over-thermal (IoT) levels for each base station in the set of base stations, one target IoT level for each available resource.

7. The method of claim 1, further comprising:
   computing local metrics for the plurality of possible actions by a base station in the set of base stations; and
   receiving local metrics for the plurality of possible actions from at least one neighbor base station in the set of base stations, and
   wherein the obtaining the overall metrics comprises determining the overall metrics for the plurality of possible actions based on the computed local metrics and the received local metrics for the plurality of possible actions.

8. The method of claim 7, wherein the determining the overall metrics comprises, for each possible action:
   combining a local metric computed by the base station for the possible action with at least one local metric received from the at least one neighbor base station for the possible action to obtain an overall metric for the possible action.

9. The method of claim 7, wherein the computing the local metrics comprises, for each possible action:
   determining allocation of available resources to the set of base stations for the possible action, determining at least one rate for at least one UE communicating with the base station based on the allocation of the available resources to the set of base stations, and determining a local metric for the possible action based on the at least one rate for the at least one UE.

10. The method of claim 9, wherein the determining the at least one rate for the at least one UE comprises determining a rate for a UE served by the base station based on a list of transmit power spectral density (PSD) levels for each base station in the set of base stations and a channel gain between the UE and each base station in the set of base stations.

11. The method of claim 9, wherein the determining the at least one rate for the at least one UE comprises determining a rate for a UE served by the base station based on a list of target interference-over-thermal (IoT) levels for each base station in the set of base stations and a channel gain between the UE and the base station.

12. The method of claim 9, wherein the determining the at least one rate for the at least one UE comprises determining a rate for a UE being handed over from a neighbor base station to the base station based on the number of UEs being served by the base station.

13. The method of claim 1, wherein the obtaining the overall metrics for the plurality of possible actions comprises:
obtaining a first set of overall metrics for a first set of possible actions related to association and resource partitioning for downlink, and
obtaining a second set of overall metrics for a second set of possible actions related to association and resource partitioning for uplink.

14. The method of claim 13, wherein the determining the serving base stations for the set of UEs and the resources allocated to the set of base stations comprises determining the serving base stations for the set of UEs, resources allocated to the set of base stations for the downlink, and resources allocated to the set of base stations for the uplink based on the first and second sets of overall metrics for the first and second sets of possible actions, each UE being served by a single base station for both the downlink and uplink.

15. The method of claim 1, further comprising:
selecting one of the plurality of possible actions based on the overall metrics for the plurality of possible actions, and
wherein the serving base stations for the set of UEs and the resources allocated to the set of base stations are determined based on the selected action.

16. An apparatus for wireless communication, comprising:
means for obtaining overall metrics for a plurality of possible actions related to association and resource partitioning, wherein each overall metric is indicative of an overall performance level of a set of base stations resulting from one of a given association-only action, a given resource partitioning-only action, or a given association and resource partitioning action; and
means for determining serving base stations for a set of user equipments (UEs) and resources allocated to the set of base stations based on the overall metrics for the plurality of possible actions.

17. The apparatus of claim 16, wherein the plurality of possible actions comprise joint actions related to both association and resource partitioning, each joint action covering handover of at least one UE between base stations in the set of base stations and allocation of at least one resource to at least one base station in the set of base stations.

18. The apparatus of claim 16, further comprising:
means for computing local metrics for the plurality of possible actions by a base station in the set of base stations; and
means for receiving local metrics for the plurality of possible actions from at least one neighbor base station in the set of base stations, and
wherein the means for obtaining the overall metrics comprises means for determining the overall metrics for the plurality of possible actions based on the computed local metrics and the received local metrics for the plurality of possible actions.

19. The apparatus of claim 18, wherein the means for computing the local metrics comprises, for each possible action:
means for determining allocation of available resources to the set of base stations for the possible action,
means for determining at least one rate for at least one UE communicating with the base station based on the allocation of the available resources to the set of base stations, and
means for determining a local metric for the possible action based on the at least one rate for the at least one UE.

20. The apparatus of claim 19, wherein the means for determining the at least one rate for the at least one UE comprises means for determining a rate for a UE being handed over from a neighbor base station to the base station based on the number of UEs being served by the base station.

21. An apparatus for wireless communication, comprising:
at least one processor configured to:
obtain overall metrics for a plurality of possible actions related to association and resource partitioning, wherein each overall metric is indicative of an overall performance level of a set of base stations resulting from one of a given association-only action, a given resource partitioning-only action, or a given association and resource partitioning action and
determine serving base stations for a set of user equipments (UEs) and resources allocated to the set of base stations based on the overall metrics for the plurality of possible actions.

22. A computer program product, comprising:
a non-transitory computer-readable medium comprising:
code for causing at least one computer to obtain overall metrics for a plurality of possible actions related to association and resource partitioning, wherein each overall metric is indicative of an overall performance level of a set of base stations resulting from one of a given association-only action, a given resource partitioning-only action, or a given association and resource partitioning action, and
code for causing the at least one computer to determine serving base stations for a set of user equipments (UEs) and resources allocated to the set of base stations based on the overall metrics for the plurality of possible actions.

23. A method for wireless communication, comprising:
obtaining overall metrics for a plurality of possible actions related to association, wherein each overall metric is indicative of an overall performance level resulting from one of a given association-only action or a given association and resource partitioning action; and
determining from the set of base stations, at least one serving base station for at least one user equipment (UE) based on the overall metrics for the plurality of possible actions.

24. The method of claim 23, wherein the plurality of possible actions comprise possible actions for handing out one or more UEs from a base station to neighbor base stations, or possible actions for handing in one or more UEs from the neighbor base stations to the base station, or both.

25. The method of claim 23, further comprising:
computing local metrics for the plurality of possible actions by a base station in a set of base stations; and
receiving local metrics for the plurality of possible actions from at least one neighbor base station in the set of base stations, and
wherein the obtaining the overall metrics comprises determining the overall metrics for the plurality of possible actions based on the computed local metrics and the received local metrics for the plurality of possible actions.

26. The method of claim 25, wherein the computing the local metrics comprises, for each possible action with one or more UEs being handed in to the base station:
determining a rate for each UE being handed in to the base station based on the number of UEs being served by the base station and current allocation of available resources to the set of base stations, and
determining a local metric for the possible action based on the rate for each UE being handed in to the base station.

27. The method of claim 23, wherein the obtaining the overall metrics for the plurality of possible actions comprises:
obtaining a first set of overall metrics for a first set of possible actions related to association for downlink, and
obtaining a second set of overall metrics for a second set of possible actions related to association for uplink, and
wherein the determining the at least one serving base station for the at least one UE comprises determining the at least one serving base station for the at least one UE based on the first and second sets of overall metrics, each UE being served by a single base station for both the downlink and uplink.

28. An apparatus for wireless communication, comprising:
means for obtaining overall metrics for a plurality of possible actions related to association, wherein each overall metric is indicative of an overall performance level resulting from one of a given association-only action or a given association and resource partitioning action; and
means for determining from the set of base stations, at least one serving base station for at least one user equipment (UE) based on the overall metrics for the plurality of possible actions.

29. The apparatus of claim 28, wherein the plurality of possible actions comprise possible actions for handing out one or more UEs from a base station to neighbor base stations, or possible actions for handing in one or more UEs from the neighbor base stations to the base station, or both.

30. The apparatus of claim 28, further comprising:
means for computing local metrics for the plurality of possible actions, by a base station in a set of base stations; and
means for receiving local metrics for the plurality of possible actions from at least one neighbor base station in the set of base stations, and
wherein the means for obtaining the overall metrics comprises means for determining the overall metrics for the plurality of possible actions based on the computed local metrics and the received local metrics for the plurality of possible actions.

31. The apparatus of claim 30, wherein the means for computing the local metrics comprises, for each possible action with one or more UEs being handed in to the base station:
means for determining a rate for each UE being handed in to the base station based on the number of UEs being served by the base station, and
means for determining a local metric for the possible action based on the rate for each UE being handed in to the base station.

32. An apparatus for wireless communication, comprising:
at least one processor configured to;
obtain overall metrics for a plurality of possible actions related to association, wherein each overall metric is indicative of an overall performance level for a given association-only action or a given association and resource partitioning action, and
determine from the set of base stations, at least one serving base station for at least one user equipment (UE) based on the overall metrics for the plurality of possible actions.

33. A computer program product, comprising:
a non-transitory computer-readable medium comprising:
code for causing at least one computer to obtain overall metrics for a plurality of possible actions related to association, wherein each overall metric is indicative of an overall performance level resulting from one of a given association-only action or a given association and resource partitioning action, and
code for causing the at least one computer to determine from the set of base stations, at least one serving base station for at least one user equipment (UE) based on the overall metrics for the plurality of possible actions.

* * * * *